(12) United States Patent
Gerards et al.

(10) Patent No.: US 8,550,053 B2
(45) Date of Patent: Oct. 8, 2013

(54) EXHAUST FLAP HOUSING AS WELL AS AN EXHAUST FLAP MEANS

(75) Inventors: Hans Gerards, Gangelt (DE); Tobias Wagner, Essen (DE); Stephan Chassée, Neuss (DE)

(73) Assignee: Pierburg GmbH, Neuss (DE)

( * ) Notice: Subject to any disclaimer, the term of this patent is extended or adjusted under 35 U.S.C. 154(b) by 1129 days.

(21) Appl. No.: 11/209,372

(22) Filed: Aug. 23, 2005

(65) Prior Publication Data
US 2006/0042239 A1    Mar. 2, 2006

(30) Foreign Application Priority Data
Aug. 24, 2004    (DE) .................. 10 2004 040 821

(51) Int. Cl.
*F01N 13/00*    (2010.01)

(52) U.S. Cl.
USPC .......................................... 123/323; 60/324

(58) Field of Classification Search
USPC ................ 123/323; 137/527, 527.8, 875; 251/129.02, 129.03, 149, 129.2, 149.8, 251/173, 306; 60/324, 272; 454/5, 2
See application file for complete search history.

(56) References Cited

U.S. PATENT DOCUMENTS

| | | | | | |
|---|---|---|---|---|---|
| 2,420,700 | A | * | 5/1947 | Curphy | 454/5 |
| 3,030,069 | A | * | 4/1962 | Cummins | 251/306 |
| 3,181,451 | A | * | 5/1965 | Hess | 454/26 |
| 3,788,072 | A | * | 1/1974 | Burger | 60/324 |
| 4,936,287 | A | | 6/1990 | Hart et al. | 126/287.5 |
| 5,355,673 | A | * | 10/1994 | Sterling et al. | 60/324 |
| 5,791,953 | A | * | 8/1998 | Gunderson et al. | 440/89 R |
| 5,947,445 | A | * | 9/1999 | Wang et al. | 251/306 |
| 6,644,337 | B2 | | 11/2003 | Heil | 137/75 |
| 6,739,579 | B1 | | 5/2004 | Rim | 251/306 |
| 6,921,327 | B2 | * | 7/2005 | Urash | 454/5 |
| 6,955,188 | B2 | * | 10/2005 | Heckt | 137/875 |

FOREIGN PATENT DOCUMENTS

DE    19526144 A1    1/1997

OTHER PUBLICATIONS

German Office Action dated Oct. 2, 2007 corresponding to German Application No. 10 2004 040 821.1.

* cited by examiner

*Primary Examiner* — Lindsay Low
(74) *Attorney, Agent, or Firm* — Ohlandt, Greeley, Ruggiero & Perle, LLP

(57) ABSTRACT

An exhaust flap housing in which an exhaust flap can be disposed comprises at least one stop element for defining end positions of the pivotable exhaust flap. To simplify the production, the stop element is preferably produced by remodeling and thus forms part of the exhaust flap housing.

4 Claims, 1 Drawing Sheet

EXHAUST FLAP HOUSING AS WELL AS AN EXHAUST FLAP MEANS

BACKGROUND OF THE INVENTION

1. Field of the Invention

The present invention relates to an exhaust flap housing as well as an exhaust flap means with an exhaust flap housing in which an exhaust flap is disposed.

2. Discussion of the Background Art

Particularly with bulky motorcar engines with, e.g., six, eight or more cylinders, it is known to turn off individual cylinders in order to save fuel. To guarantee a sufficient counterpressure in the exhaust train in spite of individual cylinders being turned off, exhaust flaps are disposed in individual exhaust pipes. Such exhaust flap means have a housing in which the exhaust flap is arranged. The housing is a tubular housing or even a portion of an exhaust pipe so that the exhaust flap is immediately built into the exhaust pipe. The exhaust flap is connected with a flap shaft that is supported in the housing so as to pivot about at least one bearing element. To limit the pivotal movement of the exhaust flap, at least one stop element is provided by which at least one end position, e.g., the opened position or the closed position, is limited. Separate components which are typically produced by machining, i.e. cutting, and are then fastened, e.g., at the inside of the exhaust flap housing, are used as stop elements. The exhaust flap then contacts the stop element in an end position. Since the exact definition of the end positions is very important, an exact installation of the stop elements is required.

SUMMARY OF THE INVENTION

It is the object of the invention to provide an exhaust flap housing in which a stop element is provided in a simple manner in a defined position.

According to the invention, the stop element is produced by remodeling the exhaust flap housing and thus forms part of the housing. The stop element, for example, is formed by making a U-shaped cut or a corresponding punching in the housing and bending the stop element into the housing interior like a tongue. Since this kind of production of the stop element can be done very exactly and the position is exactly defined, it can be guaranteed with very close tolerances that the desired position of the stop element is realized. A post-processing is not required or only to a very small degree so. The production of the stop element by remodeling the exhaust flap housing according to the invention particularly has the advantage that no separate stop element has to be connected with the exhaust flap housing in an exact position.

Thus, the stop element is preferably integrally connected with the housing via a connecting web.

It is particularly preferred to provide the stop element in the region of a passage opening for leading through a flap shaft. The production of the passage opening is particularly effected, e.g. by punching, together with the production of the slot which is, e.g., U-shaped, to permit the subsequent bending and manufacturing of the stop element in one working step. This has the advantage that the position of the stop element is defined relative to the passage opening. Preferably, two stop elements are provided which are arranged at opposed sides of the passage opening.

To be able to simply connect the exhaust flap housing with an exhaust train, the exhaust flap housing preferably has a tubular configuration and has an outer diameter at the opposite ends, which corresponds to the inner diameter of the exhaust train or an inner diameter which corresponds to the outer diameter of the exhaust train. Particularly, the two ends of the tubular exhaust flap housings may be differently configured.

Further, the invention relates to an exhaust flap means with an exhaust flap housing which is configured in the above-described manner according to the invention. An exhaust flap is arranged in the housing. The exhaust flap is connected with a flap shaft that is supported in at least one bearing element connected with the housing, which is particularly a slide bearing or a roller bearing.

The exhaust flap housing of the exhaust flap means is configured in a preferred manner as described above.

BRIEF DESCRIPTION OF THE DRAWINGS

Hereinafter, the invention is explained in detail with respect to a preferred embodiment with reference to the accompanying drawings.

In the Figures.

DETAILED DESCRIPTION OF A PREFERRED EMBODIMENT OF THE INVENTION

Figure 1:
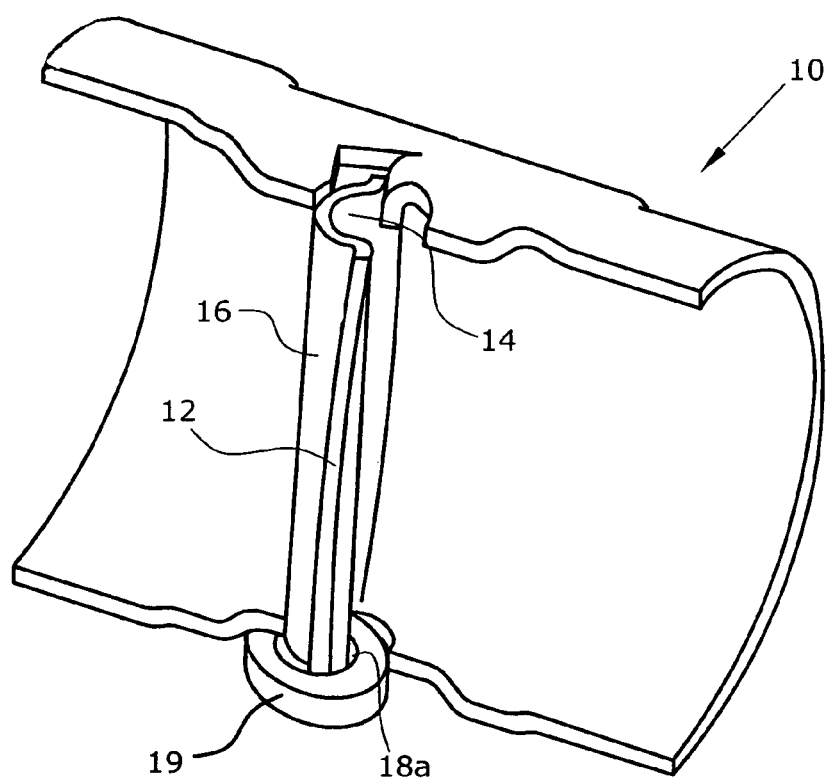
FIG. 1 is a schematic perspective partially sectioned view of an exhaust flap means.
Figure 2:
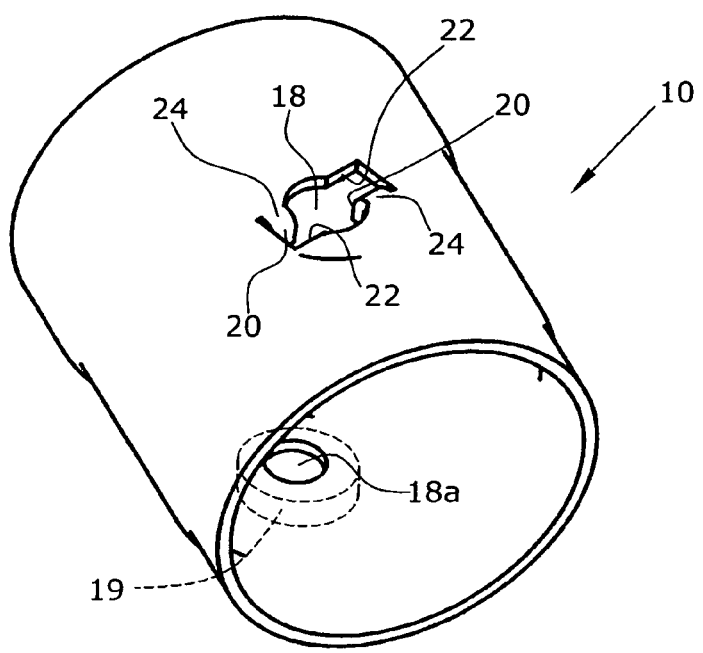
FIG. 2 is a schematic perspective view of an exhaust flap housing.

In a tubular exhaust flap housing 10, an exhaust flap 12 is arranged which comprises semicircular recesses 14 or semi-annular projections 16 for receiving a flap shaft. The flap shaft extends through the recesses 14 and through annular passage openings 18 provided in the exhaust flap housing 10.

Directly adjacent to one of the two passage openings, two stop elements 20 are provided so as to oppose each other. The stop elements 20 are integrally connected with the exhaust flap housing 10 and produced by remodeling. To this end, a U-shaped slot 22 is punched into the exhaust flap housing, respectively. Thereby, two substantially rectangular stop elements are formed which remain connected with the exhaust flap housing 10 via connecting webs 24. By remodeling or bending the projections into the interior of the exhaust flap housing 10, the two stop elements 20 are formed. The two stop elements 20 are arranged so as to oppose each other relative to the passage opening 18. Further, the connecting webs 24 are provided on opposed sides.

Although the invention has been described and illustrated with reference to a specific illustrative embodiment thereof, it is not intended that the invention be limited to this illustrative embodiment. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. An exhaust flap means for motor vehicles, comprising:
   an exhaust flap housing having a housing wall and an inner passage,
   a first annular passage through the housing wall,
   a first portion of the housing wall being bent into the inner passage to define a first u-shaped slot through the housing wall, the first u-shaped slot being positioned at a first side of the first annular passage so that the first portion defines a first stop element in the inner passage adjacent to the first annular passage and the first u-shaped slot and first annular passage form a continuous opening through the housing wall, an exhaust flap being disposed in the exhaust flap housing, and a flap shaft being connected with the exhaust flap, the flap shaft having one end received by the first annular passage so that the exhaust flap abuts the first stop element in a first position.

2. The exhaust flap means according to claim 1, further comprising a second portion of the housing wall being bent into the inner passage to define a second u-shaped slot through the housing wall, the second u-shaped slot being positioned at a second side of the first annular passage so that the second portion defines a second stop element in the inner passage adjacent to the first annular passage, wherein the one end of the flap shaft is received by the first annular passage so that the exhaust flap abuts the second stop element in a second position.

3. The exhaust flap means according to claim 2, further comprising a second annular passage through the housing wall, the second annular passage being opposite the first annular passage, wherein the flap shaft has a second end that is received by the second annular passage.

4. The exhaust flap means according to claim 3, further comprising a bearing element connected with the exhaust flap housing at the second annular passage, the flap shaft having the second end supported in the bearing element.

\* \* \* \* \*